United States Patent [19]
Akella et al.

[11] Patent Number: 5,631,194
[45] Date of Patent: May 20, 1997

[54] HEAVY METAL FLUORIDE GLASS CONTAINING INDIUM TRIFLUORIDE

[75] Inventors: Annapoorna Akella, Union City; Elizabeth A. Downing, Palo Alto, both of Calif.; Lubos J. B. Vacha, Sturbridge, Mass.

[73] Assignee: Galileo Corporation, Sturbridge, Mass.

[21] Appl. No.: 544,075

[22] Filed: Oct. 17, 1995

[51] Int. Cl.$^6$ ............................... C03C 3/32; C03C 13/04
[52] U.S. Cl. ................................. 501/40; 501/37
[58] Field of Search ............................ 501/37, 40

[56] References Cited

U.S. PATENT DOCUMENTS 4,749,666  6/1988  Lucas et al. ................. 501/40
5,309,452  5/1994  Ohishi et al. ................. 372/6
5,480,845  1/1996  Maze et al. ................... 501/37

*Primary Examiner*—Karl Group
*Attorney, Agent, or Firm*—Watson Cole Stevens Davis, P.L.L.C.

[57] ABSTRACT

A heavy metal fluoride glass composition for an optical fiber in mole percent, about: 20 to 40% $InF_3$, 20 to 0% $GaF_3$, 2 to 10% $PbF_2$, 0 to 25% $ZnF_2$, 0 to 25% $CdF_2$, 10 to 25% $BaF_2$, 0 to 6% NaCl, 0 to 6% NaF, 0 to 7% $SrF_2$ and 0 to 5% $CaF_2$; the total of $InF_3$ and $GaF_3$ being about 40%; the total of $BaF_2$, $SrF_2$ and $CaF_2$ being about 25%; the total of $ZnF_2$ and $CdF_2$ being about 25%, and the total of NaCl and NaF being about 6%; said composition being further doped with a lanthanide series heavy metal fluoride in amount up to about 1%.

18 Claims, No Drawings

HEAVY METAL FLUORIDE GLASS CONTAINING INDIUM TRIFLUORIDE

I. BACKGROUND OF THE INVENTION

A. Field of Invention

The present invention relates to heavy metal fluoride glasses for improved performance either when doped with a lanthanide series rare earth and thereafter formed into an optical fiber for use in amplification and other purposes, or which can be utilized as a bulk glass as an improvement over conventional ZBLAN glass.

B. Description of Related Art

Many glasses of varying compositions have been disclosed and discussed as a basis for utilization as a host, such material either used as a core for an optical fiber to be doped with a lanthanide series heavy metal, or for use as a bulk glass. Thus, for many years the standard glass was that known by the acronym ZBLAN, which has become a classic composition whose formula, in terms of mole percentage, is 50–55 $ZrF_4$—16–24 $BaF_2$—3–5 $LaF_3$—2–4 $AlF_3$—16–24 NaF. ZBLAN has found wide acceptance as a glass from which fluoride fibers may be formed. In fact, when such fluoride fibers are doped with a lanthanide series metal, such as praseodymium, those fibers, when used in optical systems for their amplification properties, have become referred to as PDFFA's, which stands for praseodymium-doped fluoride fiber amplifiers.

Among the patents which refer to such fibers and the mechanism by means of which they perform to produce an optical gain in an optical fiber system, is U.S. Pat. No. 5,309,452, which is specifically directed to a praseodymium laser system. However, as pointed out in that patent, research has been done into improvements in ZBLAN glass. Thus, where specific characteristics are desired to be incorporated into the ZBLAN, or simply as a less expensive substitute, zirconium ions can be replaced with hafnium and/or thorium ions, and sodium ions can be replaced with potassium, rubidium, cesium, or thallium ions. As a consequence, much experimentation based on the original ZBLAN has been performed in order to derive glasses having specific characteristics.

While for the specific purpose of forming a PDFFA glass, many different elements can be added, for example, sensitizers such as rare earth ions, including erbium, ytterbium, and neodymium ions, with additional sensitizers such as chromium ions, the present state of the art has been notably deficient in recognizing the importance of indium, and specifically indium trifluoride, as an ingredient of a glass to be used as a host for PDFFA fibers and as a bulk glass.

Indium fluoride has been mentioned in compositions disclosed in a publication of S. T. Davey, D. Szebesta and R. Wyatt, Properties of Novel Glasses for the Optimization of Pr-doped Fluoride Fibre Amplifiers, presented at the SPIE International Symposium on Fibre Laser Sources and Amplifiers V, Boston, Mass., September, 1993. In this publication the authors suggest the replacement of $AlF_3$ in traditional ZBLAN with $YF_3$ and $InF_3$, as well as the partial replacement of NaF with CsF for improved stability. The publication avers that with such glass the $^1G_4$ lifetime of $Pr^{3+}$ is almost 25% longer than in classic ZBLAN. It also refers to a publication of Ohishi et al. that improved PDFFA performance is possible from an $InF_3$-based glass. Nevertheless, the real importance of the use of a significant amount of indium fluoride has not been recognized in the prior art.

It is, therefore, an object to the present invention to provide a heavy metal fluoride glass which is based on the use of indium fluoride in a significant amount not heretofore contemplated, indeed, a glass in which the $InF_3$ is used in an amount of 10 to 40 mole percent, and preferably in the upper range of that amount. The use of such a quantity of $InF_3$ far exceeds that suggested by the Davey et al. publication, in which the $AlF_3$ in ZBLAN, has been replaced with $YF_3$ and $InF_3$. For example, if the $InF_3$ were utilized completely to replace the $AlF_3$ without the use of $YF_3$, the mole percentage of $InF_3$ would be that of the $AlF_3$ in a classical ZBLAN composition, in which 4 mole percent of $AlF_3$ is typically used. Yet, such a minor variation does not even approximate that of the use of $InF_3$ as disclosed in the present invention, where at least 10 mole percent of $InF_3$, and often up to 40%, is utilized, and therefore, greatly improved transmission characteristics of, e.g., a praseodymium-doped glass, are achieved.

As a consequence, it is another object of the present invention to devise a glass in which a high NA, low-loss composition can be used either in bulk or as a PDFFA fiber amplifier with superior optical properties, and which glass is based on the use of $InF_3$ as the principal element, usually in an amount of about 25 mole percent of the entire composition. It is another object of the present invention to devise an optical fiber doped with praseodymium, which fiber is formed from a glass having significantly improved transmission characteristics and marked by the use of at least 10% $InF_3$.

II. SUMMARY OF THE INVENTION

The present invention relates in general to the use of a heavy metal fluoride glass having superior performance when doped with a lanthanide series rare earth metal or when used as a bulk glass. In its broader concept, it comprises, in mole percent, the following general formulation: 26 to 40% $InF_3$, 0 to 14% $GaF_3$, 2 to 10% $PbF_2$, 0 to 25% $ZnF_2$, 0 to 25% $CdF_2$, 10 to 25% $BaF_2$, 0 to 6% NaCl, 0 to 6% NaF, 0 to 7% $SrF_2$, and 0 to 5% $CaF_2$. The total of the $InF_3$ and $GaF_3$ is about 40 mole percent. The total of the $BaF_2$, $SrF_2$, and $CaF_2$ is about 25%. The total of the NaCl and NaF is about 6%. The composition is doped with a lanthanide series, heavy metal fluoride in an amount of about 0.1 to 1%.

While together the $InF_3$ and $GaF_3$ total about 40%, it is desirable that the composition be more heavily weighted toward $InF_3$, and thus, if the $GaF_3$ is present in no more than about 20 percent, the $InF_3$ will be present in about 20%. More favorably, the $InF_3$ is present in about 28 mole percent, and the $GaF_3$ in about 12 mole percent. Indeed, in one form of the present invention the $InF_3$ is present in about 40 mole percent and the $GaF_3$ is absent. Further, up to about 8 mole percent of $GaF_3$ can be replaced with an equal mole percent of $YF_3$.

As stated, the total of the alkali metal fluorides is about 25 mole percent. It has been found advantageous to have the barium fluoride present in the greater proportion of that 25%. For example, in about 10 to 17 mole percent and, most preferably, in about 16.5 mole percent. When that percent of $BaF_2$ is present, a preferred composition utilizes about 5 mole percent of $SrF_2$ and 3 mole percent of $CaF_2$.

The heavy metal fluoride glass is doped with a dopant selected from the rare earth lanthanide series of elements, and the amount of the dopant is from about 0.1 to 1.0 mole percent, and most preferably 0.5%. The useful dopants presently preferred are praseodymium and erbium. When praseodymium is used as a dopant, the heavy metal fluoride glass is specifically adapted to be used as a fluoride fiber amplifier. In such use, the composition that has been found most successful thus far is, in mole percent, approximately 28% InF$_3$, 20% ZnF$_2$, 16.5 BaF$_2$, 12% GaF$_3$, 9% PbF$_2$, 6% NaF$_2$, 5% SrF$_2$, 3% CaF$_2$, and 0.5% PrF$_3$. There is a substantial absence of significantly effective quantities of ZrF$_4$.

These and other objects, features and advantages will become more apparent when considered in connection with a detailed description of the present invention, which description includes the most preferred embodiment known to the inventors at the present time.

III. DETAILED DESCRIPTION OF THE INVENTION

In order to relate the present invention to the state of the art, it is requisite that the use to which a glass is to be put is basic to its composition. While the present invention has other uses, its prime use as presently contemplated is to be formed into an optical fiber doped with Pr$^{3+}$ to produce ions that can be energized to the $^1G_4$ state, whereupon there will be an optical gain from the $^1G_4$ to $^3H_5$ transition and light is emitted at a wavelength in a range of about 1.25 to 1.34 microns. This wavelength has proved to be advantageous for communications purposes, and thus it has become an important factor in many commercial uses of optical fibers to utilize what is in effect an optical pump at the primary wavelength used in communications.

Since fiberoptic communications include, for example, sending television signals to many households over optical fibers, as those fibers are directed to individual households from the main cable transmission fibers, it has been stated that as each fiber extends to a particular household, the signal is divided. After a significant number of households have received the divided signal, there is a much diminished signal left in the optical transmission cable. So, it is required that the signal be amplified, or pumped, at intervals so that it will resume its strength until further diminished as the signal is directed toward more individual households. As a consequence, praseodymium-doped fibers which, when they pass from the $^1G_4$ to $^3H_5$ state, emit light at a wavelength of about 1.25 to 1.34 microns, are particularly well adapted for use as amplifiers for optical transmission signals.

As discussed above, ZBLAN is the traditional glass composition that has been doped with praseodymium, and efforts have been directed toward developing improved ZBLAN glass compositions. A ZBLAN-type of glass is considered improved when it exhibits lower non-radiative decay rates, which thus extends the lifetime of the glass in the $^1G_4$ state. A longer lifetime of the Pr$^{3+}$ in the metastable $^1G_4$ level is almost directly proportional to the improvement in amplification of a PDFFA. As a consequence, it is an important factor of the PDFFA glass to have as long an $^1G_4$ lifetime as possible, and as the length of the lifetime increases, so does the amplification power of the PDFFA. Thus, the composition of the glass from which the fiber is formed becomes of utmost importance, since the greater the amplification power, the shorter the length of fiber that need be utilized, and the economic savings in having a high amplification fiber are significant.

We contemplate the best mode of the present invention as employing what the art might otherwise consider an inordinately high level of InF$_3$. Our presently conceived best mode employs, in mole percent, 28% InF$_3$, 20% ZnF$_2$, 16.5% BaF$_2$, 12% GaF$_3$, 9% PbF$_2$, 6% NaF, 5% SrF$_2$, and 3% CaF$_2$, with approximately 0.5% PrF$_3$. There is an absence of any significantly effective quantity of ZrF$_4$. We also contemplate that the ZnF$_2$ may be replaced with CdF$_2$ which also improves the amplification characteristics of the glass. Because of its toxicity, however, CdF$_2$ may not immediately achieve wide acceptance.

It will be apparent that from this best mode, there are various alterations in percentages of the ingredients of the glass that may be encompassed within the scope of the present invention and, therefore, fall within its broad purview as presently contemplated. For example, the InF$_3$/GaF$_3$ ratio may vary. Thus, while the InF$_3$/GaF$_3$ component will most advantageously total approximately 40 mole percent, the proportions of the two can vary. For example, the InF$_3$ can vary between 26 and 40%, and the GaF$_3$ between 14 and 0%. Thus, the InF$_3$ may comprise the entirety of the 40%, in which case the GaF$_3$ will not be present. If, however, the InF$_3$ is present in 26 mole percent, the GaF$_3$ will be present in about 14%.

It has also been found desirable to employ ZnF$_2$ in an amount from about 10 to 25%. The use of zinc fluoride rather than zirconium fluoride has been found to enhance the optical characteristics of a lanthanide series-doped fluoride fiber.

The total of the alkali metal fluorides has been found to most advantageously comprise about 25 mole percent of the composition, i.e., the BaF$_2$, SrF$_2$ and CaF$_2$ total about 25%. Of these three ingredients, it has been found that the barium fluoride is far preferred, and at one extreme SrF$_2$ and CaF$_2$ may actually be omitted, in which case the BaF$_2$ will comprise about 25 mole percent of the composition. However, in its preferred form, the BaF$_2$ is present in about 10 to 17%, most preferably about 16.5%, at which the SrF$_2$ is present in about 5 mole percent and the CaF$_2$ in about 3 mole percent. However, it has also been discovered that up to about 6% of the ZnF$_2$ can be replaced by BaF$_2$ in addition to the BaF$_2$ that is the preferred ingredient of the alkali metal component of the fluoride glass.

A lesser quantity e.g., 2 to 10%, of PbF$_2$ is found highly desirable. In the most preferred embodiment, 9% is present. With respect to the NaF and NaCl present, it has been found that they should preferably total about 6%. When the glass is to be used as a PDFFA, NaF has been found to be more desirable than NaCl, since the latter has a greater tendency to crystallize out of the vitreous glass. With respect to the dopant from the lanthanide series, praseodymium is preferred in an amount of about 0.5%, although the quantity can vary in an amount up to 1%. When utilized for optical fibers, the PDFFA will be used substantially in the manner disclosed in U.S. Pat. No. 5,309,452, i.e., there will be a cladding around an optical fiber core according to our invention. Where necessary, it is desired that the disclosure of that patent be incorporated into the present application by reference. The core will have an index of refraction that is higher than the index of refraction of the cladding. From these two indexes of refraction, a quantity called the numerical aperture (NA) is calculated. Then, as is also known in the art, a value V is further calculated by multiplying the diameter of the core by pi and dividing that number by the wavelength of propagation, and then multiplying by numerical aperture NA. While the NA should be in a range of about 0.12 to 0.17, and the V value in a range of about 1.0 to 2.4, such ranges for those calculable quanta can be achieved without difficulty by indium trifluoride glasses of the present invention utilized to form PDFFA fibers when a suitable cladding having an index of refraction less than that of the fiber core. So, glasses having the formulae of the present invention have been found to be well suited to the manufacture of cores in which the core and the cladding or claddings will in toto constitute the PDFFA.

Tests conducted with conventional ZBLAN and glasses made in accordance with the present invention, i.e., containing significant quantities of $InF_3$, have been found to minimize energy loss from non-radiative decay from the $^1G_4$ level, and as such non-radiative loss is reduced, the lifetime at the $^1G_4$ level is increased. Thus, the present $InF_3$ compositions significantly increase the $^1G_4$ lifetime, and thereby exhibit improved optical gains by the $^1G_4-^3H_5$ transition at a wavelength in the range of 1.25 to 1.34 microns. Such reduction in non-radiative decay and concomitant increase in $^1G_4$ lifetime levels significantly improves the efficiency of the indium fluoride glasses doped with praseodymium and, therefore, significantly reduces the length of fiberoptic cable necessary in order to achieve a desired amplification of an optical signal.

It will be seen that various alterations may be made within the differing compositions disclosed hereinbefore as preferred without departing from the purview of the present invention. As to all such modifications and alterations, it is desired that they be included within the boundaries of our invention, which is to be limited only by the scope, including equivalents, of the following appended claims.

We claim:

1. A heavy metal fluoride bulk glass composition used to form an optical fiber comprising, in mole percent, about: 20 to 40% $InF_3$, 20 to 0% $GaF_3$, 2 to 10% $PbF_2$, 0 to 25% $ZnF_2$, 0 to 25% $CdF_2$, 10 to 25% $BaF_2$, 0 to 6% NaCl, 0 to 6% NaF, 0 to 7% $SrF_2$ and 0 to 5% $CaF_2$; the total of $InF_3$ and $GaF_3$ being about 40%; the total of $BaF_2$, $SrF_2$ and $CaF_2$ being about 25%; the total of $ZnF_2$ and $CdF_2$ being between about 10 to 25%, and the total of NaCl and NaF being about 6%; said composition being further doped with a lanthanide series heavy metal fluoride in an amount up to about 1%.

2. A heavy metal fluoride glass as claimed in claim 1, in which there is a substantial absence of $ZrF_4$.

3. A heavy metal fluoride glass as claimed in claim 1, in which said $GaF_3$ is present in no more than about 20 mole percent.

4. A heavy metal fluoride glass as claimed in claim 3, in which said $InF_3$ is present in about 26 mole percent and said $GaF_3$ is present in about 14 mole percent.

5. A heavy metal fluoride glass as claimed in claim 3, in which said $InF_3$ is present in about 26 to 32 mole percent and said $GaF_3$ is present in about 14 to 8 mole percent.

6. A heavy metal fluoride glass as claimed in claim 3, in which said $InF_3$ is present in about 40 mole percent and said $GaF_3$ is absent.

7. A heavy metal fluoride glass as claimed in claim 1, in which said $BaF_2$ is present in about 10 to 17 mole percent.

8. A heavy metal fluoride glass as claimed in claim 7, in which said $BaF_2$ is present in about 16.5 mole percent.

9. A heavy metal fluoride glass as claimed in claim 1, in which said $BaF_2$ is present in about 16.5 mole percent, said $SrF_2$ in about 5 mole percent, and said $CaF_2$ in about 3 mole percent.

10. A heavy metal fluoride glass as claimed in claim 1, in which said lanthanide series dopant is praseodymium.

11. A heavy metal fluoride glass as claimed in claim 1, in which said lanthanide series dopant is erbium.

12. A heavy metal fluoride glass as claimed in claim 1, in which said $PbF_2$ is present in about 9 mole percent.

13. A praseodymium-doped, heavy metal fluoride glass fiber suitable for use as an optical fiber amplifier, comprising, in mole percent, about: 20 to 40% $InF_3$, 20 to 0% $GaF_3$, 2 to 10% $PBF_2$, 0 to 25% $ZnF_2$, 0 to 25% $CdF_2$, 10 to 25% $BaF_2$, 0 to 6% NaCl, 0 to 6% NaF, 0 to 7% $SrF_2$, and 0 to 5% $CaF_2$; the total of $InF_3$ and $GaF_3$ being about 40%; the total of $BaF_2$, $SrF_2$ and $CaF_2$ being about 25%; the total of $ZnF_2$ and $CdF_2$ being between about 10 to 25%, and the total of NaCl and NaF being about 6%; said composition containing about 0.2 to 1.0 mole percent of $PrF_3$.

14. A praseodymium-doped heavy metal fluoride glass as claimed in claim 13, in which there is a substantial absence of $ZrF_4$.

15. A praseodymium-doped heavy metal fluoride glass as claimed in claim 13 including at least 30 mole percent of $InF_3$.

16. A heavy metal fluoride glass used to form an optical fiber or as a bulk glass, comprising, in mole percent, about: 28% $InF_3$, 20% $ZnF_2$, 16.5% $BaF_2$, 12% $GaF_3$, 9% $PbF_2$, 6% NaF, 5% $SrF_2$, 3% $CaF_2$, and 0.5% of a heavy metal fluoride from the lanthanide series, and in which there is a substantial absence of $ZrF_4$.

17. A praseodymium-doped heavy metal fluoride composition glass fiber suitable for use as an optical fiber amplifier, comprising, in mole percent, about: 20 to 40% $InF_3$, 2 to 10% $PBF_2$, 0 to 25% $ZnF_2$, 0 to 25% $CdF_2$, 10 to 25% $BaF_2$, 0 to 6% NaF; the $ZnF_2$ and $CdF_2$ being between about 10 to 25%; said composition containing about 0.5 mole percent of $PrF_3$.

18. A praseodymium-doped heavy metal fluoride glass as claimed in claim 17 including at least 30 mole percent of $InF_3$.

* * * * *